US011279846B2

(12) United States Patent
Weinhold et al.

(10) Patent No.: US 11,279,846 B2
(45) Date of Patent: Mar. 22, 2022

(54) COATING MATERIAL COMPOSITION, COATINGS PRODUCED THEREFROM AND THE USE THEREOF AS EROSION PROTECTION

(71) Applicant: Mankiewicz Gebr. & Co. (GmbH & Co. KG), Hamburg (DE)

(72) Inventors: Alexander Weinhold, Hamburg (DE); Antje-Sybille Frey, Hamburg (DE); Philipp Costa, Hamburg (DE); Jochen Wehner, Hamburg (DE)

(73) Assignee: Mankiewicz Gebr. & Co. (GmbH & Co. KG), Hamburg (DE)

( * ) Notice: Subject to any disclaimer, the term of this patent is extended or adjusted under 35 U.S.C. 154(b) by 137 days.

(21) Appl. No.: 16/487,894

(22) PCT Filed: Mar. 19, 2018

(86) PCT No.: PCT/DE2018/100239
§ 371 (c)(1),
(2) Date: Aug. 22, 2019

(87) PCT Pub. No.: WO2018/177466
PCT Pub. Date: Oct. 4, 2018

(65) Prior Publication Data
US 2021/0130647 A1 May 6, 2021

(30) Foreign Application Priority Data
Mar. 29, 2017 (DE) .................... 10 2017 003 034.0

(51) Int. Cl.
| C09D 175/06 | (2006.01) |
| C08G 18/12 | (2006.01) |
| C08G 18/38 | (2006.01) |
| C08G 18/42 | (2006.01) |
| C08G 18/44 | (2006.01) |
| C08G 18/73 | (2006.01) |
| C08K 3/34 | (2006.01) |
| C08K 3/22 | (2006.01) |

(52) U.S. Cl.
CPC .......... C09D 175/06 (2013.01); C08G 18/12 (2013.01); C08G 18/3821 (2013.01); C08G 18/4238 (2013.01); C08G 18/4277 (2013.01); C08G 18/44 (2013.01); C08G 18/73 (2013.01); C08K 3/34 (2013.01); C08K 2003/2241 (2013.01)

(58) Field of Classification Search
CPC .. C09D 175/06; C08G 18/12; C08G 18/3821; C08G 18/4238; C08G 18/4277; C08G 18/44; C08G 18/73; C08K 3/34; C08K 2003/2241; Y02E 10/72
See application file for complete search history.

(56) References Cited

U.S. PATENT DOCUMENTS

| 5,126,170 | A | * | 6/1992 | Zwiener | ............ | C08G 18/3821 |
| | | | | | | 427/385.5 |
| 2003/0105220 | A1 | * | 6/2003 | Gupta | ................ | C08G 18/3234 |
| | | | | | | 524/589 |
| 2007/0117947 | A1 | * | 5/2007 | Wehner | .............. | C08G 18/3814 |
| | | | | | | 528/44 |
| 2016/0009971 | A1 | | 1/2016 | Wang et al. | | |
| 2017/0152398 | A1 | | 6/2017 | Hohnholz et al. | | |
| 2017/0174933 | A1 | | 6/2017 | Hohnholz et al. | | |
| 2017/0355862 | A1 | | 12/2017 | Marauska et al. | | |
| 2018/0002479 | A1 | | 1/2018 | Mager et al. | | |

FOREIGN PATENT DOCUMENTS

| CN | 102317390 A | 1/2012 |
| CN | 105992785 A | 10/2016 |
| EP | 3 029 128 A1 | 6/2016 |
| JP | H06-17001 A | 1/1994 |
| JP | 2013-053235 A | 3/2013 |
| RU | 2011 147 581 A | 5/2013 |
| RU | 2 532 191 C2 | 10/2014 |
| WO | 2006/055038 A1 | 5/2006 |
| WO | 2010/103719 A1 | 9/2010 |
| WO | 2010/122157 A1 | 10/2010 |
| WO | 2015/120941 A1 | 8/2015 |
| WO | 2016/000845 A1 | 1/2016 |
| WO | 2016/116376 A1 | 7/2016 |

OTHER PUBLICATIONS

Dorf Ketal, Clearlink and Unilink Chain Extenders and Catalysts Product Guide, 2013, p. 1.*
International Search Report in PCT/DE2018/100239, dated May 9, 2018.

* cited by examiner

Primary Examiner — Robert S Jones, Jr.
(74) Attorney, Agent, or Firm — Collard & Roe, P.C.

(57) ABSTRACT

Coating material compositions are used for producing particularly erosion-stable coatings which are used as erosion protection, in particular as edge protection for rotor blades. The composition includes a stock component and a hardener component, wherein the stock component includes at least one trifunctional polycaprolactone polyol or at least one polycarbonate diol or at least one trifunctional polycaprolactone polyol and a polycarbonate diol and the hardener component includes at least one crystallization-resistant, isocyanate-functional prepolymer.

15 Claims, No Drawings

COATING MATERIAL COMPOSITION, COATINGS PRODUCED THEREFROM AND THE USE THEREOF AS EROSION PROTECTION

CROSS REFERENCE TO RELATED APPLICATIONS

This application is the National Stage of PCT/DE2018/100239 filed on Mar. 19, 2018, which claims priority under 35 U.S.C. § 119 of German Application No. 10 2017 003 034.0 filed on Mar. 29, 2017, the disclosure of which is incorporated by reference. The international application under PCT article 21(2) was not published in English.

The present invention relates to coating material compositions used for producing particularly erosion-stable coatings. The invention also relates to the use of these coatings as erosion protection, in particular as edge protection for rotor blades.

Object surfaces, which are exposed to mechanical stress through erosion are usually coated with erosion protection agents. The term "erosion" is defined hereafter as a damage of a material, in particular of its surface, caused by liquid or solid substances moving in the form of drops or particles within a gaseous or liquid medium. Well-known examples for erosion are rain, hail, dust and sand that affect rotor blades of wind power plants, helicopters, aircraft wings and marine screw propellers.

The resistance of surfaces to erosion is achieved by the application of coatings, which, on the one hand, are elastic enough to cushion the impact forces and which, on the other hand, show a sufficient hardness and abrasion resistance. The whole surface of a component like, for instance, a rotor blade can be coated with these erosion protection coatings. It is also possible to coat only particularly exposed surface areas of a component like, for example, the leading edge of a rotor blade.

International patent application WO 2015/120941 discloses erosion-stable coating materials with one binder and one hardener component, with the binder component comprising a combination of polycarbonate diols and polyaspartic esters and with the hardener component comprising one hexamethylene diisocyanate isocyanurate prepolymer containing aliphatic polyester groups and having an isocyanate content of 5% to 23%. However, in order not to adversely affect erosion resistance, only organosilane-modified pigments and fillers can be employed for these coating materials. The choice of the employable pigments and fillers is therefore limited so that it is not possible to create every shade of colour without having an adverse effect on the erosion protection. Furthermore, it has been noted that the molecular sieve usually employed as water catcher adversely affects erosion resistance in a significant way. However, if a molecular sieve is not employed, the application of the coating material is somewhat difficult in case of humidity due to the side reaction of the isocyanate groups with water.

International patent application WO 2016/000845 discloses two-component coating materials, with the binder component comprising polycarbonate polyols and aliphatic secondary amines that contain at least one aliphatic group between the nitrogen atoms, and with the hardener component comprising polyisocyanate-modified polyesters having an isocyanate content of 4% to 15%.

It has been observed that the coatings made of these coating materials do not show sufficient weathering resistance.

The term "weathering" is defined hereafter as the stress on the coatings caused by UV radiation, temperature and humidity, both in nature by the weather and under artificial conditions in laboratories by UV radiation, in accordance with defined humidity conditions. Furthermore, the coatings as defined by WO 2016/000845 soften under influence of temperature, with the erosion resistance of the coating getting lost.

The surface temperature of a rotor blade of a wind power plant may reach up to 80° C. in operation, which has a significantly adverse effect on the erosion protection to be achieved by the coating.

Hence, the problem of the present invention is to provide a coating material for the production of improved erosion protection coatings, especially edge protection coatings, which are to show above all an improved processability and a higher weathering resistance.

The problem, which the invention is based upon is solved by a coating material comprising a two-component composition, its use for the production of an erosion protection coating as well as a component coated with this coating material according to the present claims. Further embodiments are shown in the description and the dependent claims.

The term "coating material" is defined hereafter as a liquid or pasty composition, which develops a coating by curing after its application onto a substrate. The curing process comprises both drying by evaporation of the solvent and the chemical reaction of the composition components.

The coating material composition according to the invention comprises two components, a binder component and a hardener component. The binder component contains at least one trifunctional polycaprolactone polyol or at least one polycarbonate diol or at least one polycaprolactone polyol and one polycarbonate diol. The binder component shows an OH content of between 0.55 and 1.75 mol/kg, preferably between 0.8 and 1.5 mol/kg, more preferably of approx. 1.15 mol/kg.

The physico-chemical properties of the applied polycaprolactone polyols and polycarbonate diols are important to achieve not only erosion resistance but also a good weathering resistance. Suitable polycaprolactone polyols according to the invention show a functionality of equal to or greater than 2, preferably equal to or greater than 3, with the functionality indicating the number of the covalent bonds that a molecule is able to form with other reactants. The polycaprolactone polyols show average molar masses based on the number average (hereafter referred to as average molar mass) in the range of 250 to 2000 g/mol, preferably 300 to 1500 g/mol, more preferably 330 to 1000 g/mol. Furthermore, they show hydroxyl numbers in the range of 150 to 650 mg KOH/g, preferably 160 to 620 mg KOH/g, more preferably 170 to 590 mg KOH/g. The hydroxyl number states hereafter the quantity of potassium hydroxide in milligramme, which is equivalent to the quantity of acetic acid bonded upon acetylization of one gramme of substance.

Suitable polycarbonate diols according to the invention show average molar masses in the range of 300 to 3000 g/mol, preferably 350 to 2000 g/mol, more preferably 400 to 1000 g/mol. Furthermore, they show hydroxyl numbers in the range of 35 to 300 mg KOH/g, preferably 50 to 280 mg KOH/g, more preferably 75 to 250 mg KOH/g.

Furthermore, the binder component may contain at least one secondary diamine, preferably an aliphatic secondary amine. As preferred according to the invention the binder component shows an NH content of 0.42 to 1.25 mol/kg, more preferably 0.6 to 1.0 mol/kg, most preferably of 0.85 mol/kg.

In a particularly preferred embodiment the diamine employed is a polyaspartic ester. The use of polyaspartic esters in coating material components is known. The employed polyaspartic esters are polyamines with secondary amino groups, especially with two secondary amino groups. The components can be obtained by preparation methods known and familiar to a skilled person, as for example by addition of primary, preferably aliphatic diamines onto maleic or fumaric dialkyl esters or else by addition of primary, preferably aliphatic amines onto unsaturated polyesters. Alkyl groups can be linear, branched or cyclic.

Suitable polyaspartic esters are described by the formula (I) below.

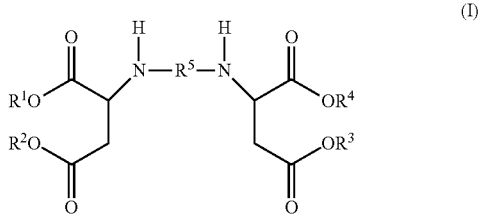

where R1, R2, R3 and R4 independently of one another are alkyl groups having 1 to 12 carbon atoms, preferably 1 to 4 carbon atoms, and R5 is a divalent alkylene group having 6 to 24 carbon atoms, preferably 6 to 16 carbon atoms.

In accordance with the present invention, preference is given to the use of non-aromatic, aliphatic—with particular preference to saturated—polyaspartic esters.

In particularly preferred embodiments, R1, R2, R3 and R4 are ethyl groups. Particularly preferred alkylene groups R5 are groups of the formula (II), (III) or (IV).

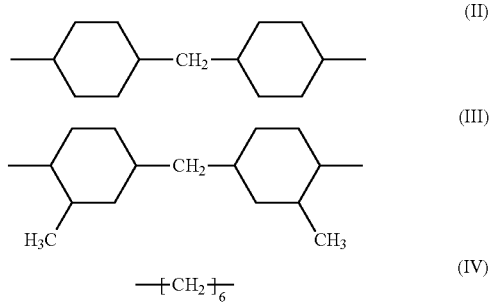

Suitable polyaspartic esters are available, for example, in the Desmophen NH product line from Covestro Deutschland AG (Leverkusen, Germany).

The polyaspartic esters employed according to the invention show an amine value of 120 to 300 mg KOH/g, preferably 140 to 260 mg KOH/g, with the amine value indicating the quantity KOH in milligramme that is equivalent to the amine content of 1 g of substance. The amine value is determined by potentiometric titration.

The mass ratio of polyols to amines lies between 0.1:1 and 5:1, preferably 0.5:1 and 2:1, more preferably between 0.8:1 and 1.2:1, most preferably between 0.9:1 and 1.1:1, especially at approx. 1:1. The combination of polyols and amines as defined by the invention leads to particularly long pot lives in the range from 5 to 10 minutes whereas the curing time with 2 to 4 hours at a temperature of 23° C. is quite short.

The hardener component contains at least one crystallization stable isocyanate-functional polyester prepolymer, as discloses International Patent Application WO 2016/116376. These prepolymers are HDI polyester prepolymers having an NCO content of 2.8 to 18 wt % and a mean isocyanate functionality of 1.9 to 3.0. These are obtained by reaction of 1,5-diisocyanatopentane and/or 1,6-diisocyanatohexane with (A) at least one polyester polyol of mean functionality from 1.9 to 2.3 and an average molar mass of 300 to 3000 g/mol, and with (B) at least one polycaprolactone polyester of mean functionality from 2.0 to 3.0 and an average molar mass of 176 to 2000 g/mol, at temperatures of 20 to 200° C. in compliance with an equivalent ratio of isocyanate groups to hydroxyl groups of 4:1 to 200:1. The polyester polyol (A) is prepared from aliphatic dicarboxylic acids and/or anhydrides thereof with excess amounts of polyfunctional alcohols, where the polyfunctional alcohols are branched aliphatic diols to an extent of at least 30 wt % based on the total amount of polyfunctional alcohols. The proportion of the polyester polyols (A) in the total amount of polyester components (A) and (B) incorporated in the prepolymers is from 15 to 70 wt %.

Aliphatic, saturated and unsaturated dicarboxylic acids or the anhydrides thereof having 4 to 12 carbon atoms as well as polyhydric aliphatic or cycloaliphatic alcohols having 2 to 18 carbon atoms are used for the preparation of the employed polyester polyols (A).

Suitable dicarboxylic acids or anhydrides are, for example, succinic acid, succinic anhydride, glutaric acid, adipic acid, pimelic acid, suberic acid, azelaic acid, sebacic acid, decanedicarboxylic acid, maleic acid, maleic anhydride, fumaric acid, itaconic acid, itaconic anhydride, hexahydrophthalic acid, hexahydrophthalic anhydride, tetrahydrophthalic acid and tetrahydrophthalic anhydride, which can be used either individually or in the form of any mixtures with one another. Suitable polyfunctional alcohols are, for example, ethane-1,2-diol, propane-1,3-diol, butane-1,4-diol, pentane-1,5-diol, hexane-1,6-diol, heptane-1,7-diol, octane-1,8-diol, nonane-1,9-diol, decane-1,10-diol, dodecane-1,12-diol, cyclohexane-1,2- and -1,4-diol, cyclohexane-1,4-dimethanol, 4,4'-(1-methylethylidene)biscyclohexanol, propane-1,2,3-triol (glycerol), 1,1,1-trimethylolethane, hexane-1,2,6-triol, 1,1,1-trimethylolpropane, 2,2-bis(hydroxymethyl)propane-1,3-diol, low molecular weight polyether diols like, for example, diethylene glycol and dipropylene glycol, and branched aliphatic diols like, for example, propane-1,2-diol, butane-1,3-diol, 2-methylpropanediol, 2,2-dimethyl-1,3-propanediol (neopentyl glycol), hexane-1,2-diol, 2-methylpentane-2,4-diol, 3-methylpentane-1,5-diol, 2-ethylhexane-1,3-diol, octane-1,2-diol, 2,2,4-trimethylpentane-1,5-diol, 2-butyl-2-ethylpropane-1,3-diol, 2,2,4- and/or 2,4,4-trimethylhexanediol, decane-1,2-diol as well as mixtures thereof. At the same time the polyfunctional alcohols have a content of branched aliphatic diols of at least 30 wt % based on the total amount of polyfunctional alcohols used.

Preferred polyester polyols (A) are those based on the reaction product of succinic acid and/or adipic acid with ethane-1,2-diol, butane-1,4-diol, hexane-1,6-diol, glycerol, 1,1,1-trimethylolpropane and the branched aliphatic diols butane-1,3-diol, neopentyl glycol, 2-butyl-2-ethylpropane-1,3-diol, 2,2,4-trimethylpentane-1,5-diol and 2,2,4- and/or 2,4,4-trimethylhexanediols, where the proportion of branched aliphatic diols in the total amount of polyfunctional alcohols used amounts to at least 30 wt %.

The employed polyester polyols (B) consist of at least one polyester polyol of mean functionality from 2.0 to 3.0 and of number-average molecular weight from 176 to 2200 g/mol, as obtainable in a manner known per se from ε-caprolactone and simple polyhydric alcohols as starter molecules with ring opening. Starter molecules used for the ring-opening polymerization may, for instance, be di- or trifunctional alcohols mentioned above by way of example as suitable starting compounds for preparation of the polyester polyols (A), or any other mixtures of these alcohols. The preparation of the ε-caprolactone polyester polyols (B) by ring-opening polymerization is generally effected in the presence of catalysts, for example Lewis or Brönsted acids, organic tin or titanium compounds, at temperatures of 20 to 200° C. Preferred polyester polyols (B) are those, which have been prepared using butane-1,4-diol, diethylene glycol, neopentyl glycol, hexane-1,6-diol, glycerol and/or 1,1,1-trimethylolpropane as starter molecule.

Suitable crystallization stable isocyanate-functional polyester prepolymers show a dynamic viscosity of 800 to 2500 mPas, preferably 1000 to 2000 mPas, more preferably 1200 to 1800 mPas, where the viscosity is determined by commercially available viscosimeters or rheometers as shear viscosity with a shear rate of 100/s at 25° C. Furthermore, crystallization stable isocyanate-functional polyester prepolymers show NCO contents from 1.5 to 6 mol/kg, preferably from 1.8 to 5.5 mol/kg, more preferably from 1.9 to 3.5 mol/kg, most preferably from 2 to 3 mol/kg.

In a preferred embodiment of the invention the hardener component contains further HDI and/or PDI oligomers like uretdiones, isocyanurates, allophanates, biurets and iminooxadiazine-dione. Preferred oligomers are uretdiones and/or isocyanurates.

The coating material composition as defined by the invention delivers coatings, the erosion protection properties of which are not adversely affected by solids like pigments and fillers that are contained in the formulation. It is therefore possible to obtain erosion protection coatings with many different pigmentations and in the desired shades of colour. Furthermore, it has been observed that solid additives like a molecular sieve can be added to the coating material compositions according to the invention without having an adverse effect on the erosion resistance. On the contrary, in comparison to the known formulations an improvement of the erosion resistance has been observed. The use of a molecular sieve, which is usually employed as water catcher in polyurethane systems (PUR systems) improves the processing properties of the coating material composition. The compositions as defined by the invention can therefore be applied when there is high air humidity and also rain without having an adverse effect on the properties of the cured coating.

The coating material compositions as defined by the invention deliver coatings having a high weathering resistance, especially a low or no susceptibility to water at all. Moreover, they are temperature stable and do not soften in case of higher temperatures of up to 80° C. that can easily be reached on the surface of the rotor blades of a wind power plant in operation.

In a preferred embodiment of the present invention the binder components and the hardener components are employed in a volumetric mixing ratio of between 10:1 and 0.1:1, better between 5:1 and 0.2:1, preferably between 4:1 and 0.25:1, more preferably between 2:1 and 0.5:1, most preferably of approx. 1:1.

As mixing of fluxes of material of equal volume works exceptionally well, the coating materials can be applied out of cartridges very easily. A homogeneous mixing is important for a uniform curing of the coating material and consequently for a uniform formation of the coating properties.

In a further embodiment according to the invention the molar ratio of the sum of the NH and OH groups of the binder components to the isocyanate groups of the hardener components, [OH+NH]:NCO, lies in the range of 1:0.5 to 1:2, preferably 1:0.7 to 1:1.3, more preferably 1:0.8 to 1:1.2. According to a particularly preferred embodiment the ratio [OH+NH]:NCO is close to a stoichiometric molar ratio of 1:1, e.g. in a range from 1:0.9 to 1:1.1, preferably 1:0.95 to 1:1.05, more preferably at approx. 1:1. With regard to the particularly preferred embodiment the relative quantities of binder component and hardener component are chosen in a way that the molar ratio of the sum of hydroxyl and NH groups to isocyanate groups is almost equimolar.

The variation of the mass ratio of polycaprolactone polyols with a low molar mass to polycaprolactone polyols with a higher molar mass in the binder component makes it possible to easily adjust the volumetric mixing ratio to the preferred value of approx. 1:1 by maintaining the desired [OH+NH]:NCO ratio of hardener and binder component.

In a further embodiment, the coating materials according to the invention may contain pigments. Suitable pigments are organic pigments known to and commonly used by a skilled person, such as arylamide yellow, diarylide yellow, nickel azo yellow, anthrapyrimidine yellow, pyranthrone yellow, isoindolinone yellow, arylamide orange, diarylide orange, azo-condensation orange, anthanthrone orange, pyrenthrone orange, trans perinone orange, chinacridone orange, isoindolinone orange, toluidine-red, lithol red, naphthol AS red, azo-condensation red, perylene red, thioindigo red, chinacridone red, isoindolinone red, isoviolanthrone violet, indanthrene violet, chinacridone violet, dioxazine violet, phthalocyanine blue, indanthrene blue, phthalocyanine green, bone black and aniline black.

In accordance with the present invention suitable pigments are also inorganic pigments known to and commonly used by a skilled person, such as titanium dioxide, zinc sulfide, lithophones, zinc oxide, antimony oxide, iron oxide yellow, nickel titanium yellow, molybdate orange, red iron oxide, copper oxide, molybdate red, ultramarine red, mixed phase red, mineral violet, mangan violet, ultramarine violet, iron blue, ultramarine blue, cobalt blue, chromoxide green, chromoxihydrate green, ultramarine green, mixed phase green pigments, iron oxide brown, mixed phase brown, iron oxide black, antimony sulfide, graphite, gas black, thermal black, furnace black, lamp black or acetylene black. Preference is given to inorganic pigments, especially titanium dioxide, zinc sulfide, lithophones, zinc oxide, antimony oxide, iron oxide yellow, nickel titanium yellow, molybdate orange, red iron oxide, copper oxide, molybdate red, ultramarine red, mixed phase red, mineral violet, mangan violet, ultramarine violet, iron blue, ultramarine blue, cobalt blue, chromoxide green, chromoxihydrate green, ultramarine green, mixed phase green pigments, iron oxide brown, mixed phase brown, iron oxide black, antimony sulfide, graphite, gas black, thermal black, furnace black, lamp black and acetylene black. Very particularly preferred pigments are titanium dioxide, zinc sulfide, lithophones, zinc oxide, red iron oxide, copper oxide, molybdate red, ultramarine red, mixed phase red, iron oxide black, gas black, thermal black, furnace black, lamp black and acetylene black. The pigments are used in quantities from 0 to 35 wt %, preferably 1 to 25 wt %, more preferably 1.5 to 15 wt %, most preferably 2 to 10 wt %, based on the total weight of the coating material.

In a further embodiment, the coating materials according to the invention may contain fillers. These are understood to be different substances, used in granular or powder form, for example, which are employed for the purpose of achieving particular physical properties in coating materials, and which are insoluble in the respective application medium. Preferred fillers are inorganic fillers, especially carbonates like calcium carbonate, dolomite or barium carbonate, sulphates such as calcium sulphate and barium sulfate, silicates and phyllosilicates such as wollastonite, talcum, pyrophyllite, mica, china clay, feldspar, precipitated calcium silicates, precipitated aluminium silicates, precipitated calcium-aluminium silicates, precipitated sodium-aluminium silicates and mullite, wollastonite, silicon dioxide, quartz and cristobalite.

In the context of the present invention, silicon dioxides are subordinate to the silicates group. Further inorganic fillers are precipitated silicas or fumed silicas as well as metal oxides such as aluminium hydroxide and magnesium hydroxide.

In a further embodiment according to the invention the coating materials may contain fillers in quantities of up to 45 wt %, preferably 0.1 to 40 wt %, more preferably 1 to 30 wt %, most preferably 5 to 25 wt %, based in each case on the total weight of the coating material.

Preferred inorganic fillers are acicular fillers and silicates, preferably acicular silicates, wollastonite in particular. Wollastonite, as is known, is a common designation for calcium metasilicate, and in the naturally occurring wollastonite up to 2 wt % of the calcium ions may have been replaced by magnesium, iron and/or manganese ions. Wollastonite is preferably employed in quantities of 0.1 to 25 wt %, more preferably of 5 to 20 wt. %, most preferably of 10 to 15 wt %, based in each case on the total weight of the coating material.

In a further preferred embodiment the coating compositions, as defined by the invention, contain a molecular sieve. Molecular sieve is the designation for natural or synthetic zeolites having a relatively high internal surface and uniform pore diameters. The result of this is a relatively high adsorption power. Hence, they are employed, amongst others, as adsorbents, e. g. as water catchers. A suitable molecular sieve in accordance with the invention has a pore size of 2 to 10 angstroms, preferably 2.5 to 4 angstroms, more preferably of approx. 3 angstrom. The coating material compositions according to the invention contain quantities of molecular sieve of 0.1 to 15 wt %, preferably 1 to 10%, more preferably 2 to 8 wt %, based in each case on the total weight of the coating material.

The pigments and fillers employed in the coating material compositions according to the invention do not necessarily have to be surface-treated. Untreated solids can be used, too.

In a further embodiment the coating material, as defined by the invention, shows a filling ratio in the range of 5 and 50%. The term "filling ratio" is defined hereafter as the mass percentage of those insoluble solids that are present in the uncured coating material composition, based on the total weight of the coating material composition. The coating material preferably shows a filling ratio in the range from 10 to 40%, more preferably from 15 to 35%, most preferably from 20 to 30%. Especially advantageous is a filling ratio of approx. 25%.

In a further preferred embodiment of the coating material composition according to the invention, light stabilizers can be employed in quantities of up to 10 wt %, preferably 0.5 to 5 wt %, more preferably 1 to 3 wt %, based in each case on the total weight of the coating material. Suitable light stabilizers are, for example, UV absorbers and radical scavengers such as substituted 2,2,6,6-tetramethylpiperidines, 2-hydroxyphenyl-triazines, 2-hydroxybenzophenones and mixtures thereof.

The coating material composition according to the invention may also comprise catalysts for the catalysis of the reaction of hydroxyl groups and amino groups with isocyanate groups. The coating composition comprises preferably 0.01 to 2 wt %, more preferably 0.02 to 1 wt %, based in each case on the total weight of the composition, of at least one catalyst. Suitable catalysts are the known metal catalysts such as, for example, tin, molybdenum, zirconium or zinc catalysts as well as tertiary amines. Particularly suitable catalysts are molybdenum, zirconium or zinc catalysts.

Furthermore, the coating material compositions according to the present invention may contain the usual auxiliary materials and additives known and familiar to a skilled person, such as wetting agents, rheological additives or bonding agents, flow improving additives, defoamers and deaerating agents. The additives and auxiliary materials may be employed in quantities of 0.1 to 15 wt %, preferably 0.2 to 10 wt %, more preferably 0.3 to 8 wt %, based in each case on the total weight of the coating material.

In one preferred embodiment the components of the coating material composition are formulated in solvent-free form. The binder and hardener component can alternatively be diluted with common solvents. Aprotic solvents are particularly suitable. The term "aprotic solvent" is defined hereafter as a solvent having no ionizable proton in the molecule. Suitable solvents in accordance with the present invention are, for example, aliphatic hydrocarbons, cycloaliphatic hydrocarbons, aromatic hydrocarbons, ketones, esters, ethers, ether esters, especially ethyl acetate, butyl acetate, acetone, n-butanone, methyl isobutyl ketone, methoxy propyl acetate as well as xylol. Preferably used solvents are ethyl acetate, butyl acetate, acetone, n-butanone, methyl isobutyl ketone, methoxy propyl acetate and mixtures thereof.

The above mentioned pigments, fillers, molecular sieve, additives and solvents can be employed both in the binder component and in the hardener component of the coating material compositions. In accordance with the present invention, solids, especially pigments, fillers and molecular sieve are preferably employed in the binder component.

After the mixing of binder and hardener components the coating material, as defined by the present invention, shows a resistance to sag of greater than 400 µm after having been applied onto a vertically upright surface.

EXAMPLES

Table 1 shows the coating material compositions of the examples of the present invention (E1 to E6) as well as those of the comparative examples (V1 to V4). The employed quantities are indicated in parts by weight.

TABLE 1

|  | E1 | E2 | E3 | E4 | E5 | E6 | V1 | V2 | V3 | V4 |
|---|---|---|---|---|---|---|---|---|---|---|
| Binder component | | | | | | | | | | |
| Capa 3091 | 15 | | 30 | | 15 | 15 | 15 | 15 | 15 | 15 |
| Ethernacoll PH50 | | 15 | | 30 | | | | | | |
| Desmodur NH 1420 | 15 | 15 | | | 15 | 15 | 15 | 15 | 15 | 15 |
| Kronos 2310 | 10 | 10 | 10 | 10 | 10 | 10 | 10 | 10 | 10 | 10 |
| Tremin 939 | 10 | 10 | 10 | 10 | 10 | 10 | 10 | 10 | 10 | 10 |
| Sylosiv A3 | 5 | 5 | 5 | 5 | 5 | 5 | 5 | 5 | 5 | 5 |
| Hardener component | | | | | | | | | | |
| Hardener 1 | 47.4 | 52.5 | 45.1 | 55.3 | | | | | | |
| Hardener mixture 2 | | | | | 36.3 | | | | | |
| Hardener mixture 3 | | | | | | 39.2 | | | | |
| Desmodur N 3800 | | | | | | | 39.2 | | | |
| Adiprene LFH2840 | | | | | | | | 51.4 | | |
| Desmudur N 3600 | | | | | | | | | 18.8 | |
| Desmodur N 3400 | | | | | | | | | | 19.8 |

Employed raw materials:

The crystallization stable isocyanate-functional polyester prepolymers employed in the hardener component are described in International Patent Application WO 2016/116376.

Hardener 1:

corresponds to the crystallization stable prepolymer described in example 1 of International Patent Application WO2016/116376, which is prepared by reaction of hexamethylene diisocyanate (HDI) with a polyester polyol mixture, which is a reaction product of neopentyl glycol, butane-1,4-diol, hexane-1,6-diol, 2,2,4-trimethylpentane-1,3-diol, 2-butyl-2-ethylpropane-1,3-diol with ε-caprolactone polyesters initiated with adipic acid as well as diethylene glycol and glycerol.

Hardener mixture 2:

corresponds to the mixture described in example 18 of WO2016/116376 of 80 parts by weight of hardener 1 and 20 parts by weight of Desmodur N3600.

Hardener mixture 3:

corresponds to the mixture described in example 19 of WO2016/116376 of 85 parts by weight of hardener 1 and 15 parts by weight of Desmodur N3400.

Desmodur N 3400 (Covestro Deutschland AG):

low-viscosity HDI polyisocyanate comprising uretdiones (delivered form 100%, NCO content: 21.8%, equivalent weight: 193 g/val NCO, viscosity (23° C.): 175 mPas)

Desmodur N3600 (Covestro Deutschland AG):

low-viscosity HDI trimer (delivered form 100%, NCO content: 23.0%, equivalent weight: 183 g/val NCO, viscosity: (23° C.) 1200 mPas)

Desmodur N 3800 (Covestro Deutschland AG):

isocyanate-terminated HDI isocyanurate polycaprolactone prepolymer (delivered form 100%, NCO content: 11.0%, equivalent weight: 382 g/val NCO, viscosity (23° C.): 6000 mPas)

Adiprene LFH 2840 (Chemtura Corp.):

isocyanate-terminated HDI polycaprolactone prepolymer (delivered form 100%, NCO content: 8.4%, equivalent weight: 500 g/val NCO, viscosity (22° C.): 1890 mPas)

Desmophen NH 1420 (Covestro Deutschland AG):

Polyaspartic ester, difunctional (delivered form 100%, equivalent weight: 276 g/val NH)

Capa 3031 (Perstorp Holding AB):

Polycaprolactone polyol, trifunctional (delivered form 100%, OH content: 5.56%, equivalent weight: approx. 300 g/val OH)

Ethernacoll PH 50 (UBE Chemical Europe SA):

Polycarbonate polyol difunctional (delivered form 100%, OH content: 6.8%, equivalent weight: approx. 250 g/val OH)

Sylosiv A3 (Grace GmbH & Co. KG):

Molecular sieve 3A

Kronos 2310 (Kronos Titan GmbH):

Titanium dioxide pigment

Tremin 939 (Quarzwerke Frechen):

Wollastonite, particle length to particle diameter: approx. 8:1

The binder components and hardener components have been prepared by bringing together the corresponding components and by mixing them homogeneously in a disperser (dissolver).

2. Tests

In order to evaluate the cured coatings, tests regarding erosion resistance and weathering resistance are carried out on specimens coated with coating materials of the examples E1 to E6 and those of the comparative examples V1 to V4. For the preparation of the specimens the binder components and the hardener components of a sample composition are mixed homogeneously. For this purpose the quantities of binder component and hardener component have been chosen in a way that the molar ratio of the sum of hydroxyl and NH groups to isocyanate groups is approximately 1:1.

The coating material thus obtained is applied onto a specimen. The specimens consist of usual fibre-glass reinforced epoxy resin substrates that are precoated with known polyurea-based pore fillers. The applied coating material is cured for a period of a fortnight at a temperature of between 20 to 25° C. and a relative humidity of 50%. The obtained dry film thickness is 400 μm.

2.1. Test methods

In order to evaluate the erosion resistance, the coated specimens undergo a rain erosion test. For this purpose an in-house test stand has been erected. The specimens are fixed onto a rotor. The rotor moves through a rain simulating rain field at a defined tangential velocity of between 94 m/s at the specimen's end facing towards the rotation axis of the rotor and 157 m/s at the specimen's end facing away from the rotation axis. In a common test scenario, which is also applied in the field of wind energy, a velocity of 140 m/s and rain of an intensity of 30 mm/h are used. Rain intensity is defined as the volume of rain falling per unit of time and per unit of area. Usually, the rain intensity during the test is inversely proportional to the test time. In order to reduce test time, a higher rain intensity has been chosen for a velocity of 140 m/s.

The flow rate of the water is kept constant. On the coated surface of the specimen the flow rate during rotary motion corresponds to a precipitation rate of 475 mm/h. The average droplet size is 2 to 3 mm. The specimens are exposed to the simulated rain at a temperature of between 20 and 25° C. until the substrate becomes visible. Besides, the specimens are visually examined at intervals of 15 minutes.

In order to evaluate the weathering resistance, the specimens are exposed to artificial weathering that simulates natural weathering due to the cyclic application of radiation, humidity and increased temperature. For this purpose the test cycle that consists of a drying phase and a condensation phase is repeated for 1,500 hours. During the drying phase of the test cycle the specimens are exposed to a four-hour irradiation with a QUV-B lamp (emission maximum at 313 nm) at a black panel temperature of 60° C. During the subsequent four-hour condensation phase in water vapour the latter condenses on the specimens at a black panel temperature of 50° C.

In order to be able to carry out an analysis of the tests the specimens undergo a visual examination according to the following criteria:

| | |
|---|---|
| very good | no visible change |
| good | slight swelling, no considerable softening |
| bad | considerable swelling or softening, no sagging yet |
| very bad | considerable softening or swelling with sagging |

2.2. Results

Table 2 shows the results of the examples of the present invention.

TABLE 2

| | E1 | E2 | E3 | E4 | E5 | E6 |
|---|---|---|---|---|---|---|
| Rain erosion resistance in minutes | 480 | 515 | 450 | 480 | 420 | 420 |
| Weathering resistance | very good | very good | very good | good | very good | good |

Table 3 shows the results of the comparative examples.

TABLE 3

| | V1 | V2 | V3 | V4 |
|---|---|---|---|---|
| Rain erosion resistance in minutes | 60 | 75 | 15 | 30 |
| Weathering resistance | bad | very bad | good | bad |

The rain erosion resistance and the weathering resistance of the examples of the coatings according to the present invention (E1 to E6) are considerably higher than those of the comparative examples (V1 to V4).

The invention claimed is:

1. A composition for the production of an erosion protection coating comprising a binder component and a hardener component, with the binder component having at least one trifunctional polycaprolactone polyol or at least one polycarbonate diol or at least one trifunctional polycaprolactone polyol and one polycarbonate diol, and with the hardener component having at least one crystallization stable isocyanate-functional prepolymer obtained by reaction of 1,5-diisocyanatopentane and/or 1,6-diisocyanatohexane with (A) at least one polyester polyol of mean functionality from 1.9 to 2.3 and an average molar mass of 300 to 3000 g/mol, and with (B) at least one polycaprolactone polyester of mean functionality from 2.0 to 3.0 and an average molar mass of 176 to 2000 g/mol, and wherein the binder component has an NH content of 0.42 to 1.0 mol/kg.

2. The composition according to claim 1, wherein the binder component comprises furthermore at least one secondary diamine.

3. The composition according to claim 1, wherein the binder component has an OH content of between 0.55 and 1.75 mol/kg.

4. The composition according to claim 1, wherein the binder component has an NH content of approx 0.83 mol/kg.

5. The composition according to claim 1, wherein the binder component has a mass ratio of polyaspartic esters to polyols of 0.8:1 to 1:1.2.

6. The composition according to claim 1, wherein the polyester polyols (A) are prepared by reaction of aliphatic dicarboxylic acids or anhydrides thereof having 4 to 12 carbon atoms with polyhydric aliphatic or cycloaliphatic alcohols having 2 to 18 carbon atoms, and wherein the polyester polyols (B) are prepared by ring-opening polymerization of s-caprolactones with polyhydric aliphatic or cycloaliphatic alcohols having 2 to 18 carbon atoms as starter molecules.

7. The composition according to claim 1, wherein the hardener component has NCO contents from 1.5 to 6 mol/kg.

8. The composition according to claim 1, wherein the hardener component contains HDI and/or PDI oligomers.

9. The composition according to claim 1, wherein the volumetric mixing ratio of the binder component and the hardener component lies between 0.9:1 and 1:1.2.

10. The composition according to claim 1, wherein the composition contains furthermore pigments and/or fillers.

11. The composition according to claim 1, wherein the composition contains furthermore a molecular sieve.

12. An erosion protection coating comprising the composition according to claim 1.

13. A component comprising the erosion protection coating according to claim 12.

14. The component according to claim 13, wherein the component is a rotor blade of a wind power plant or of a helicopter, an aircraft wing or a marine screw propeller.

15. The component according to claim 13, comprising at least one edge, wherein the coating is positioned on the at least one edge for edge protection.

* * * * *